United States Patent
Kozono et al.

(10) Patent No.: US 12,107,368 B2
(45) Date of Patent: Oct. 1, 2024

(54) CONNECTOR

(71) Applicant: Yazaki Corporation, Tokyo (JP)

(72) Inventors: Seiji Kozono, Kakegawa (JP);
Yoshitaka Tsushima, Fujieda (JP);
Masaya Okamoto, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 352 days.

(21) Appl. No.: 17/852,997

(22) Filed: Jun. 29, 2022

(65) Prior Publication Data
US 2023/0010734 A1 Jan. 12, 2023

(30) Foreign Application Priority Data

Jul. 7, 2021 (JP) .................. 2021-112927

(51) Int. Cl.
*H01R 13/453* (2006.01)
*H01R 13/631* (2006.01)

(52) U.S. Cl.
CPC ....... *H01R 13/631* (2013.01); *H01R 13/4532* (2013.01)

(58) Field of Classification Search
CPC .............. H01R 13/631; H01R 13/6315; H01R 13/635; H01R 13/62905; H01R 13/629; H01R 13/62; H01R 13/4532; H01R 13/453; H01R 13/4534; H01R 13/4536; H01R 13/4538
See application file for complete search history.

(56) References Cited

U.S. PATENT DOCUMENTS

| | | | | |
|---|---|---|---|---|
| 5,372,515 A * | 12/1994 | Miller | ............... | H01R 13/6485 439/138 |
| 6,520,782 B2 * | 2/2003 | Mori | ............... | B60L 53/16 439/138 |
| 6,685,362 B2 * | 2/2004 | Burkholder | ............... | G02B 6/3849 439/607.34 |
| 6,877,999 B2 * | 4/2005 | Hashimoto | ............... | H01R 13/4532 439/138 |
| 6,887,086 B2 * | 5/2005 | Kuroki | ............... | H01R 13/4532 439/138 |

(Continued)

FOREIGN PATENT DOCUMENTS

| | | |
|---|---|---|
| JP | 2012-79628 A | 4/2012 |
| WO | 03/073559 A1 | 9/2003 |

*Primary Examiner* — Harshad C Patel
(74) *Attorney, Agent, or Firm* — Sughrue Mion, PLLC

(57) ABSTRACT

There is a connector including: a first connector; and a second connector that has a cover configured to cover a front surface opening of a housing and a biasing member that biases the cover to a position where a cover portion covers the front surface opening. An opening edge of the front surface opening includes an inclined plane that intersects with a connector fitting direction and that is parallel to a rotation axis of the cover, the inclined plane intersecting at an obtuse angle with a straight line that extends from an opening edge end portion of the front surface opening and that orthogonal to the rotation axis. The connector is designed to rotate the cover to a position where the cover portion does not cover the front surface opening in response to a protruding portion of the first connector pressing a pressed portion of the cover.

3 Claims, 11 Drawing Sheets

(56) References Cited

U.S. PATENT DOCUMENTS

| | | | | |
|---|---|---|---|---|
| 7,140,892 | B2* | 11/2006 | Takeuchi | H01R 13/6583 |
| | | | | 439/138 |
| 8,376,760 | B1* | 2/2013 | Kostrzewski | G06F 21/86 |
| | | | | 439/138 |
| 10,355,390 | B2* | 7/2019 | Ferran Palau | H01R 13/629 |
| 11,715,903 | B2* | 8/2023 | Kozono | H01R 35/04 |
| | | | | 439/367 |
| 11,721,926 | B2* | 8/2023 | Kozono | H01R 13/4532 |
| | | | | 439/139 |
| 12,003,056 | B2* | 6/2024 | Kozono | B60L 53/16 |
| 12,046,850 | B2* | 7/2024 | Kozono | H01R 13/4536 |
| 2023/0006395 | A1* | 1/2023 | Kozono | H01R 13/631 |

* cited by examiner

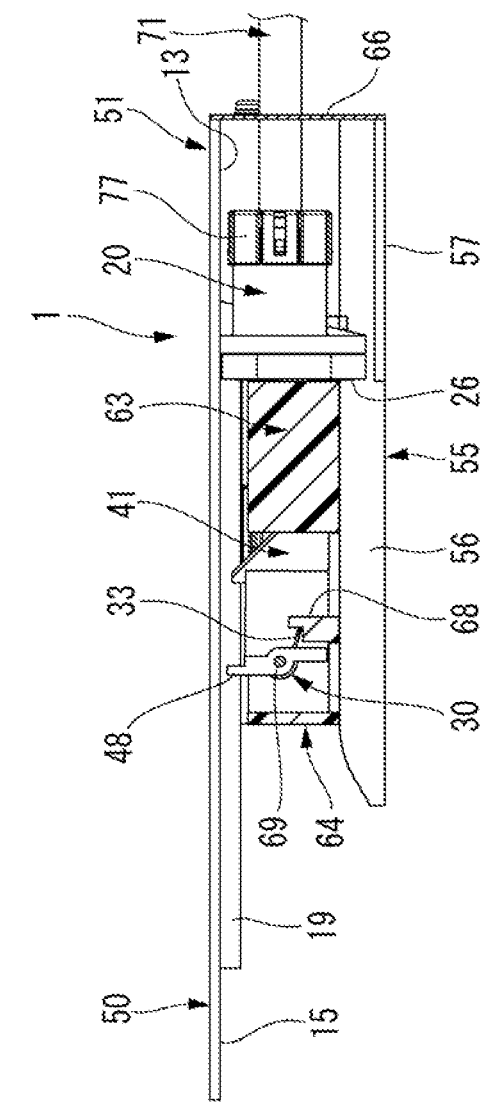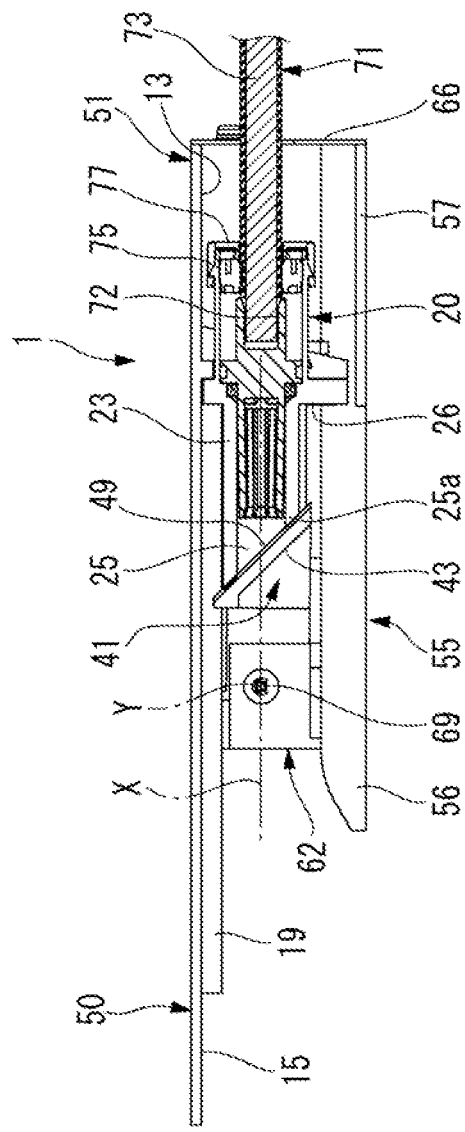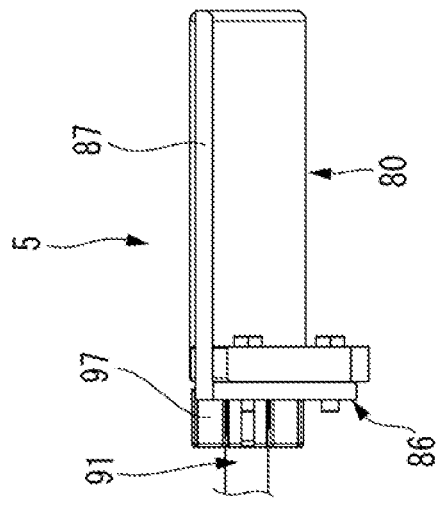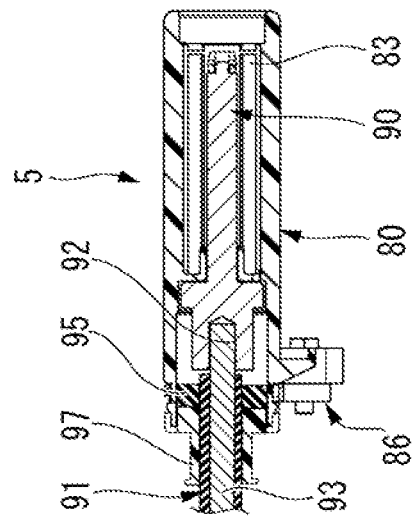
FIG.6A
FIG.6B

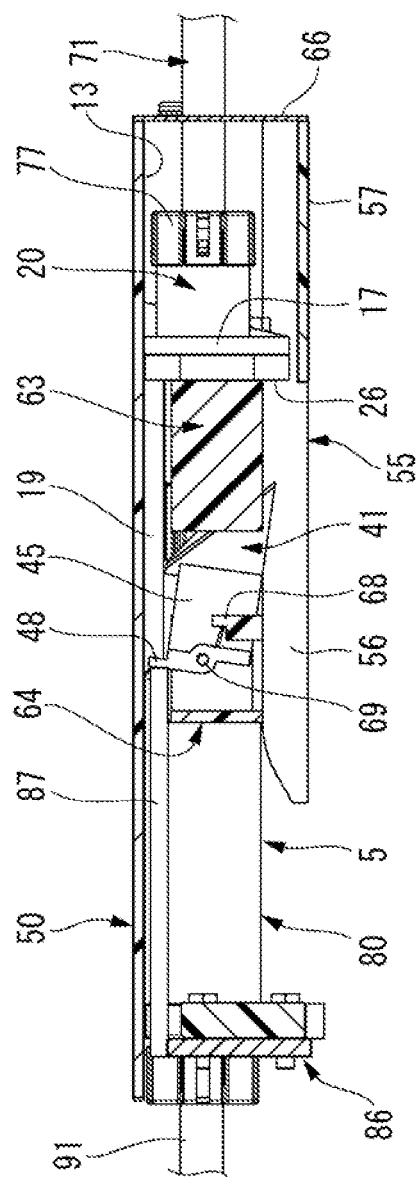
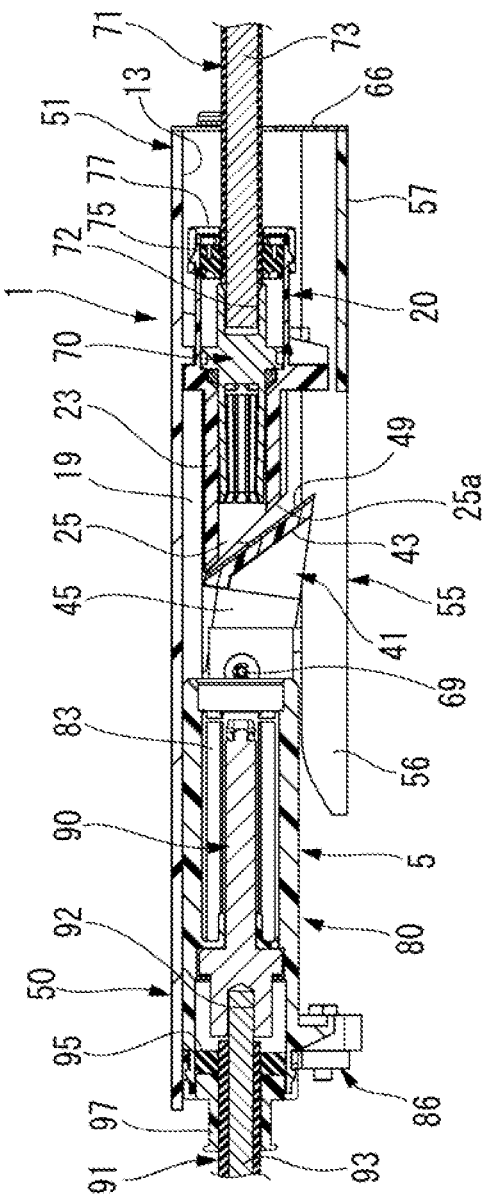
FIG.7A
FIG.7B

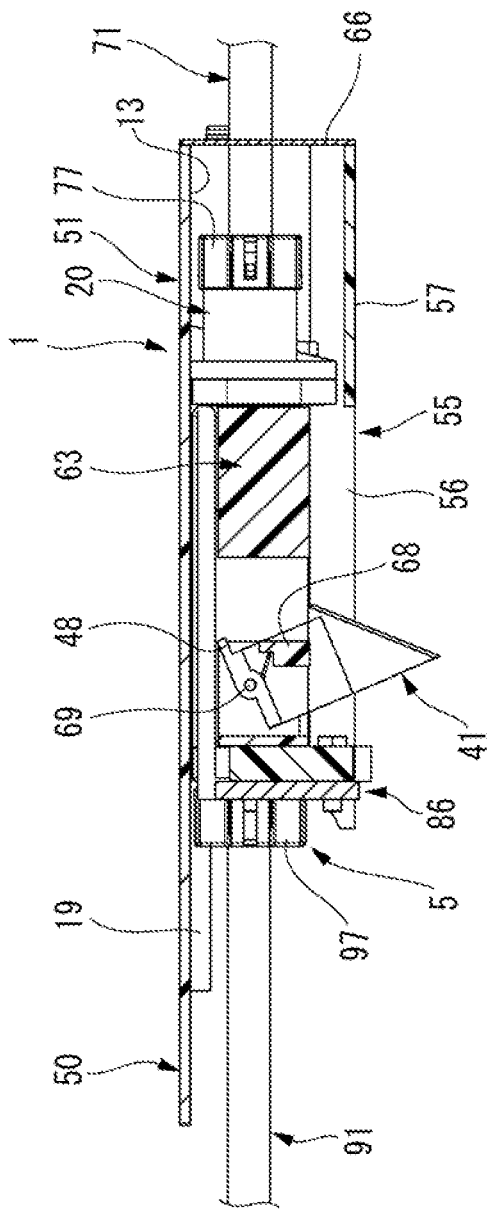
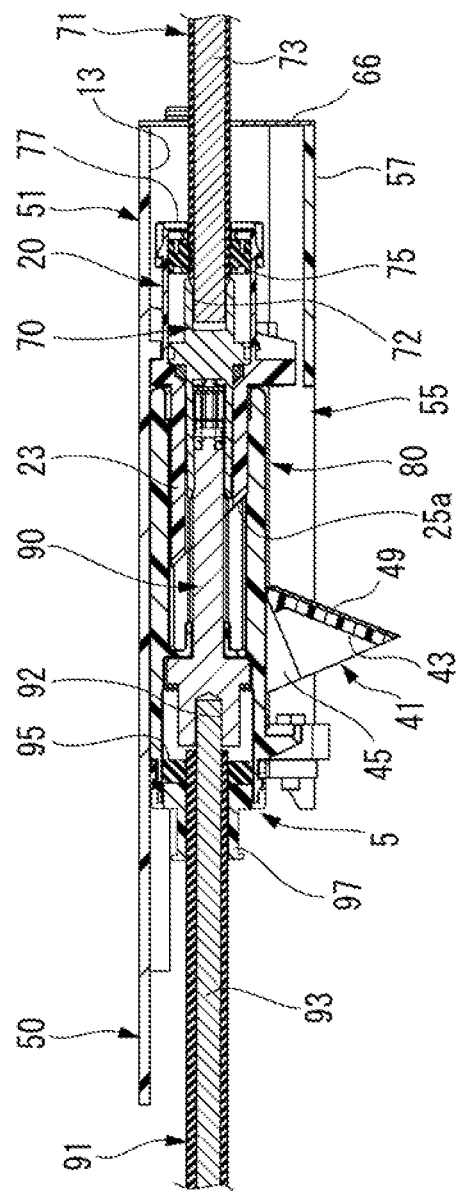
FIG.11A
FIG.11B

CONNECTOR

CROSS-REFERENCE TO RELATED APPLICATIONS

This application is based on and claims priority under 35 USC 119 from Japanese Patent Application No. 2021-112927 filed on Jul. 7, 2021, the contents of which are incorporated herein by reference.

TECHNICAL FIELD

The present disclosure relates to a connector having a cover mechanism.

BACKGROUND ART

In the related art, a wire harness (electric wire) for electrically connecting various electrical components mounted on an automobile and the like performs connection by a connector. Such a connector is usually constituted by a male connector and a female connector. Then, for example, in the case of a connector structure applied to optional specifications, one connector connected to an end portion of an electric wire disposed in advance is provided with a cover mechanism at a front opening of a housing for purposes such as dust prevention, terminal protection, prevention of electric shock to the surroundings, and the like until the other connector is fitted. In particular, in an electric vehicle and the like, a cover-mechanism-equipped connector (inlet) is applied in order to prevent an electric shock accident and the like, and exposure of a terminal at a front opening is prevented when the connector is not connected. As an example of such a configuration, JP2012-079628A discloses a charging cable connection structure, for example.

In this charging cable connection structure, a lid body (cover) that slides between a position covering a socket portion (front surface opening) and a position not covering the socket portion is provided, and the lid body is biased to the position covering the socket portion by a spring (biasing member). In addition, the lid body includes an abutting portion for abutting a side portion of a plug portion of a charging cable, and a positioning unit for determining an abutting position of the plug portion with respect to the abutting portion. The positioned plug portion is configured to face the socket portion when the lid body is slid to a position not covering the socket portion.

A user can cause the plug portion of the charging cable to face the socket portion and insert the plug portion into the socket portion by performing an operation of abutting the plug portion of the charging cable on the abutting portion and sliding the lid body.

However, in the charging cable connection structure disclosed in JP2012-079628A, when the lid body is slid by the plug portion of the charging cable at the time of connector fitting, the lid body slides with respect to an opening edge of the socket portion, and therefore, there is a possibility that the opening edge of the socket portion and the lid body rub against each other. In particular, when an elastic packing is provided on an inner surface of the lid body in order to reliably prevent entry of dust, water, and the like into the socket portion, wear may occur in a sliding portion of the elastic packing.

In addition, a space for sliding the lid body in a direction intersecting an insertion direction into the socket portion is required, and a charging port becomes large.

SUMMARY OF INVENTION

The present disclosure provides a connector which is compact and can prevent wear of a housing and a cover in a cover-mechanism-equipped connector.

According to an illustrative aspect of the present disclosure, a connector includes: a first connector; and a second connector, in which the first connector and the second connector are fitted and electrically connected to each other. The first connector includes a first housing that houses a first connection terminal, and a protruding portion that protrudes from the first housing toward the second connector along a connector fitting direction. The second connector includes a second housing that houses a second connection terminal, a cover that has a cover portion configured to cover a front surface opening of the second housing and that is provided rotatably between a first position where the cover portion covers the front surface opening and a second position where the cover portion does not cover the front surface opening, and a biasing member that biases the cover to the first position. The cover is rotatably supported about a rotation axis positioned on a front projection plane to which the front surface opening is projected in front of the second housing than the front surface opening. The front surface opening includes an opening edge with which the cover portion contacts to cover the front surface opening, and an opening edge end portion positioned on a rear side in a direction in which the cover portion rotates from the first position toward the second position. The opening edge includes an inclined plane that intersects with the connector fitting direction and that is parallel to the rotation axis, the inclined plane intersecting at an obtuse angle with a straight line that extends from the opening edge end portion and that orthogonal to the rotation axis. The connector is designed to rotate the cover to the second position in response to the protruding portion pressing a pressed portion of the cover.

The present disclosure has been briefly described above. Details of the present disclosure will be further clarified by reading through an embodiment for implementing the invention described below (hereinafter referred to as the "embodiment") with reference to the accompanying drawings.

BRIEF DESCRIPTION OF DRAWINGS

FIG. 6A is a cross-sectional view taken along line A-A in FIG. 5, and FIG. 6B is a cross-sectional view taken along line B-B in FIG. 5.

FIGS. 7A and 7B are a longitudinal cross-sectional view showing a state immediately after the inlet and the inlet plug shown in FIG. 5 start to be fitted to each other, in which FIG. 7A corresponds to a cross section taken along line A-A in FIG. 5, and FIG. 7B corresponds to a cross section taken along line B-B in FIG. 5.

FIGS. 11A and 11B are a longitudinal cross-sectional view showing a state in which the inlet and the inlet plug shown in FIG. 5 are completely fitted to each other, in which FIG. 11A corresponds to a cross section taken along line A-A in FIG. 5, and FIG. 11B corresponds to a cross section taken along line B-B in FIG. 5.

DESCRIPTION OF EMBODIMENTS

Hereinafter, an example of an embodiment according to the present disclosure will be described with reference to the drawings.

Figure 1:
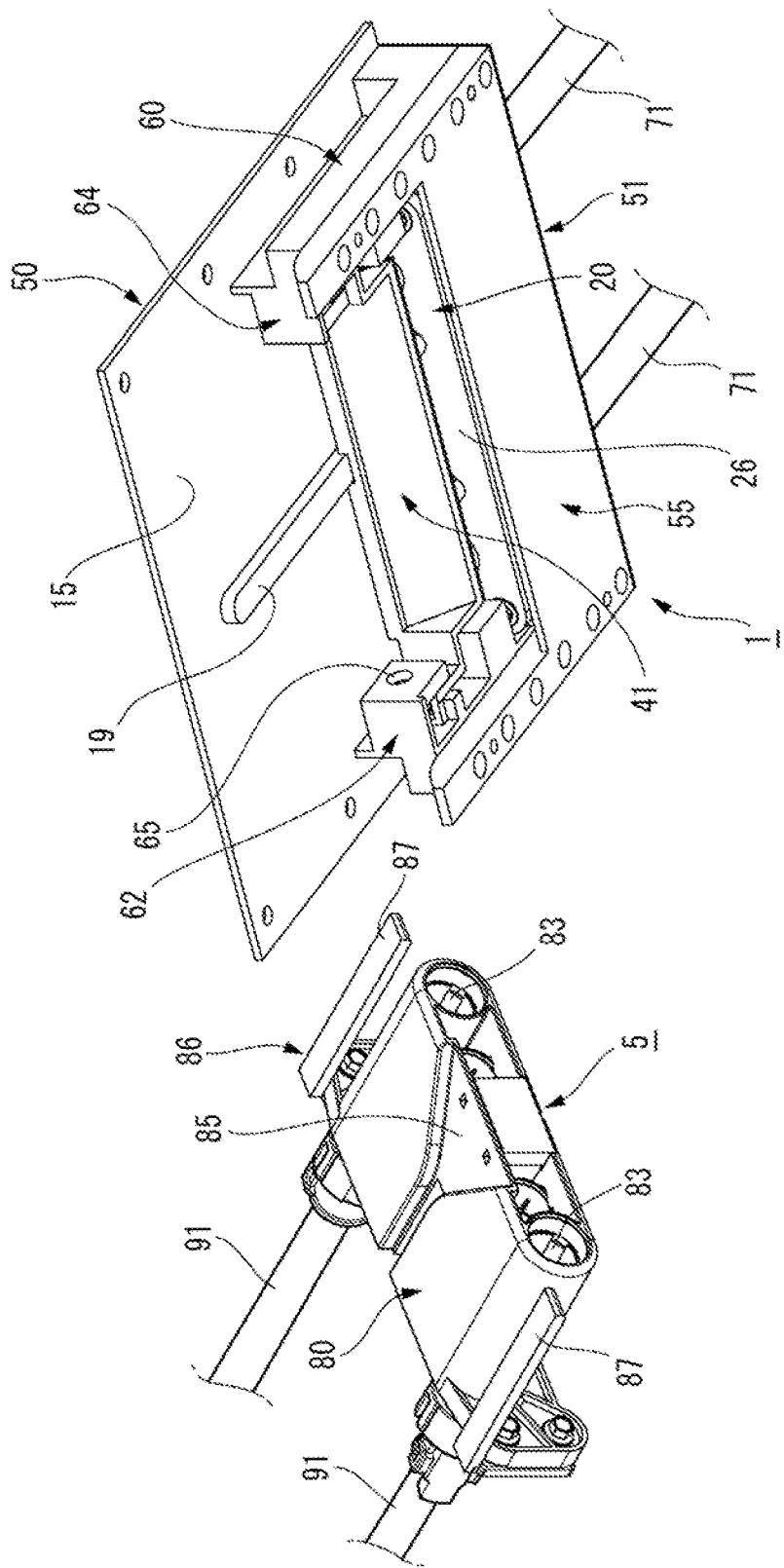
FIG. 1 is a perspective view showing an inlet as a second connector and an inlet plug as a first connector to be fitted to the inlet, which constitute a connector according to an embodiment of the present disclosure.
Figure 2:
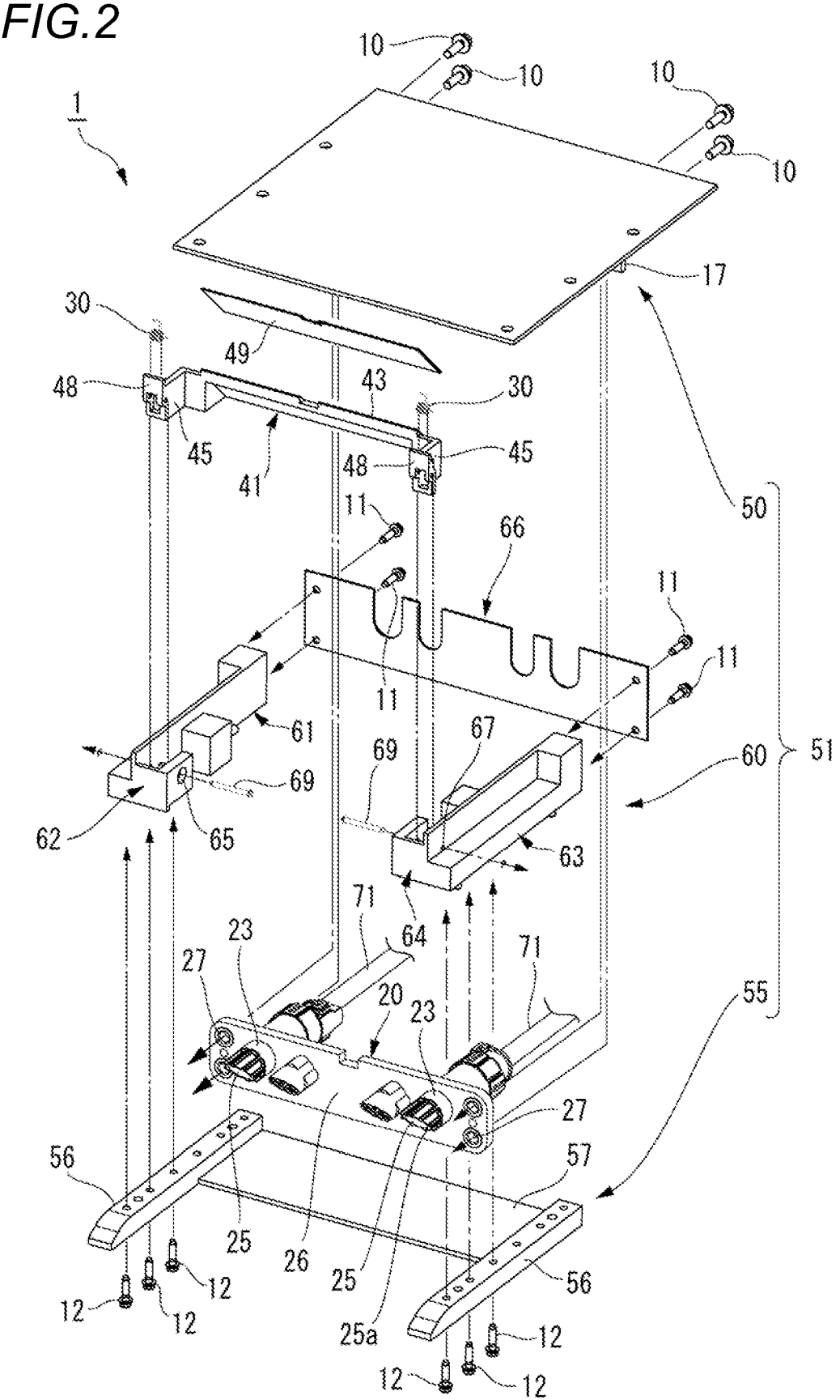
FIG. 2 is an exploded perspective view of the inlet shown in FIG. 1.
Figure 3:
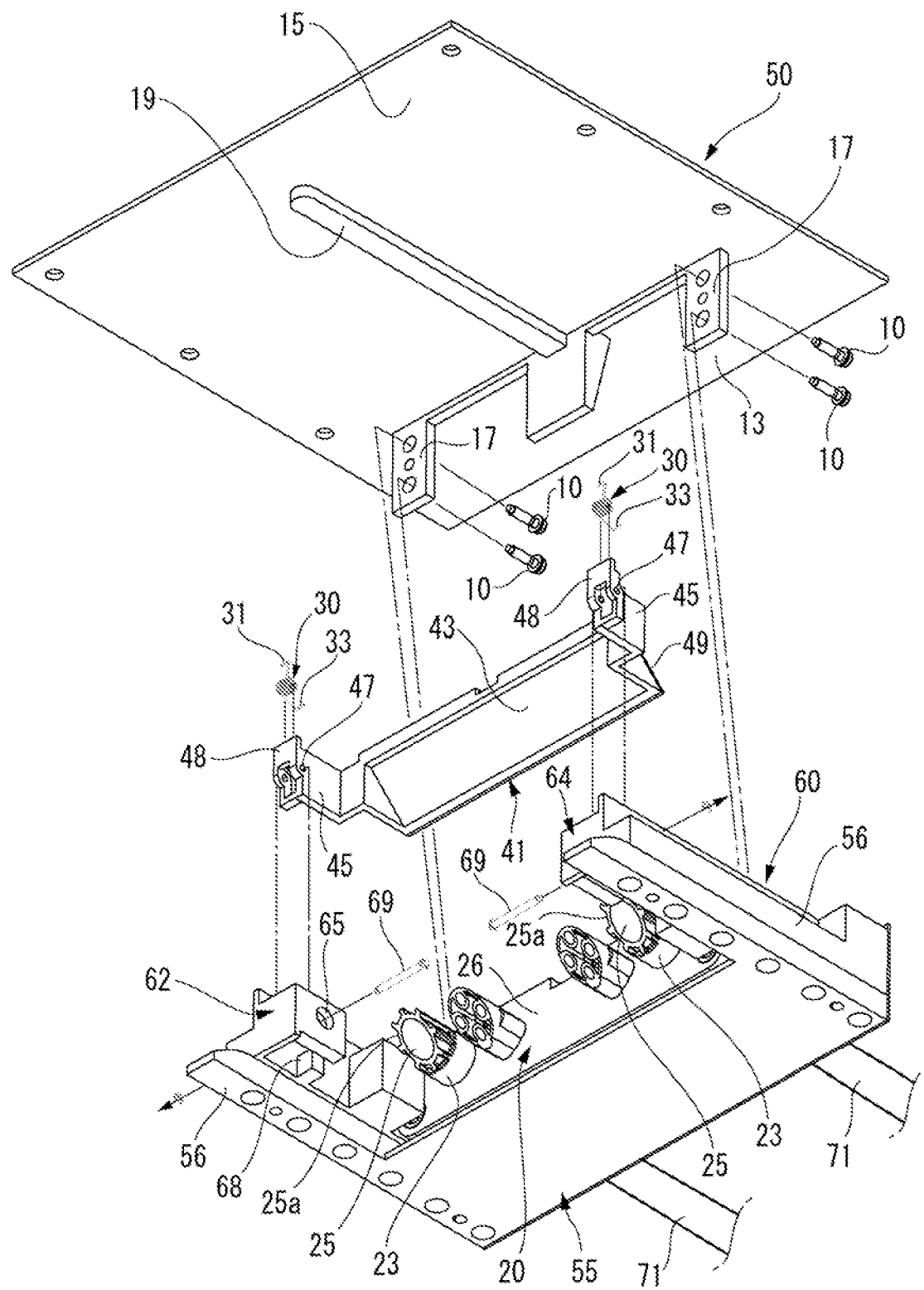
FIG. 3 is a perspective view showing a state in which a top plate and a cover are separated from the inlet shown in FIG. 1.

FIG. 1 is a perspective view showing an inlet 1 as a second connector and an inlet plug 5 as a first connector to be fitted to the inlet 1, which constitute a connector according to the embodiment of the present disclosure. FIG. 2 is an exploded perspective view of the inlet 1 shown in FIG. 1. FIG. 3 is a perspective view showing a state in which a top plate 50 and a cover 41 are separated from the inlet 1 shown in FIG. 1.

As shown in FIGS. 1 and 2, the inlet 1 as the second connector according to the present embodiment is a cover-mechanism-equipped connector including a housing 20 as a second housing that houses a connection terminal (second connection terminal) 70, an outer case 51 that houses and holds the housing 20, the cover 41 that covers a front surface opening 25 of the housing 20 to which a plug housing 80 of the inlet plug 5 as the first connector is fitted, and torsion coil springs 30 as biasing members that elastically bias the cover 41 in a direction in which the cover 41 closes the front surface opening 25.

In the present specification, a front-rear direction is a direction along a connector fitting direction (a left-right direction in FIGS. 6A and 6B) of the housing 20. A side where the plug housing 80 of the inlet plug 5 is fitted is defined as the front side. An upper-lower direction is a direction (an upper-lower direction in FIGS. 6A and 6B), in which the cover 41 opens and closes, orthogonal to the connector fitting direction of the housing 20. The top plate 50 side of the outer case 51 is defined as the upper side.

The housing 20 of the inlet 1 is formed of an electrically insulating synthetic resin. A front wall 26 of the housing 20 is provided with a pair of terminal housing cylinder portions 23, 23 protruding toward the inlet plug 5 side.

The connection terminal 70 connected to a terminal portion of a high-voltage cable 71 is housed in the terminal housing cylinder portion 23. The high-voltage cable 71 connected to the connection terminal 70 is drawn out from a rear end opening of the terminal housing cylinder portion 23.

The front surface opening 25 into which a connection terminal (first connection terminal) 90 of the inlet plug 5 is inserted is formed at a front end of the terminal housing cylinder portion 23. Then, an opening edge 25a of the front surface opening 25 has an inclined plane F that intersects with an opening center line X of the front surface opening 25 parallel to the connector fitting direction and is parallel to a rotation axis Y (a rotation center of the cover 41), and that intersects with a straight line Z, which extends from an opening edge end portion 25b of the front surface opening 25 on a rear side of a direction R in which a cover portion 43 of the cover 41 rotates from a position where the cover portion 43 covers the front surface opening 25 toward a position where the cover portion 43 does not cover the front surface opening 25 and which orthogonal to the rotation axis Y, at an obtuse angle (see FIG. 8). That is, the opening edge 25a of the front surface opening 25 in the present embodiment has an inclined surface shape inclined obliquely downward from the upper side toward the rear side of the front end. The inclination angle of the opening edge 25a is appropriately set according to a position and the like of the rotation axis Y serving as the rotation center of the cover 41 where the cover portion 43 faces the opening edge 25a.

The connection terminal 70 is a female terminal formed of a conductive metal material, and is formed in a cylindrical rod shape. A joint hole 72 is formed in a rear end portion of the connection terminal 70. A conductor 73 of the high-voltage cable 71 drawn out from the rear end opening of the terminal housing cylinder portion 23 is inserted into the joint hole 72, and is crimped and connected to the joint hole 72 (see FIGS. 6A and 6B).

A seal member 75 is attached to the high-voltage cable 71 drawn out from the rear end opening of the terminal housing cylinder portion 23, and is liquid-tightly sealed to the terminal housing cylinder portion 23. The seal member 75 is restricted from being detached by a rear holder 77 attached to a rear end of the terminal housing cylinder portion 23.

In addition, as shown in FIG. 2, screw holes 27 are provided at left and right ends of the front wall 26 of the housing 20. The front wall 26 of the housing 20 is screwed and fixed to a fixing piece 17 of the top plate 50 by screws 10.

As shown in FIG. 2, the outer case 51 is a flat housing formed by a bottom frame 55, a main body frame 60, and the top plate 50.

In the bottom frame 55, a pair of support frames 56, 56 extending in the front-rear direction of the housing 20 and a bottom plate portion 57 connecting the pair of support frames 56, 56 are integrally formed.

The main body frame 60 includes side wall members 61, 63, which are respectively screwed and fixed to the support frames 56, 56 by screws 12 and are disposed on both left and right sides of the housing 20, and a rear panel 66 which is screwed and fixed to rear ends of the side wall members 61, 63 by screws 11.

Cover support portions 62, 64 that rotatably support the cover 41, which will be described later, are respectively provided at front end portions of the side wall members 61, 63 that are both side walls of the outer case 51.

Figure 4:
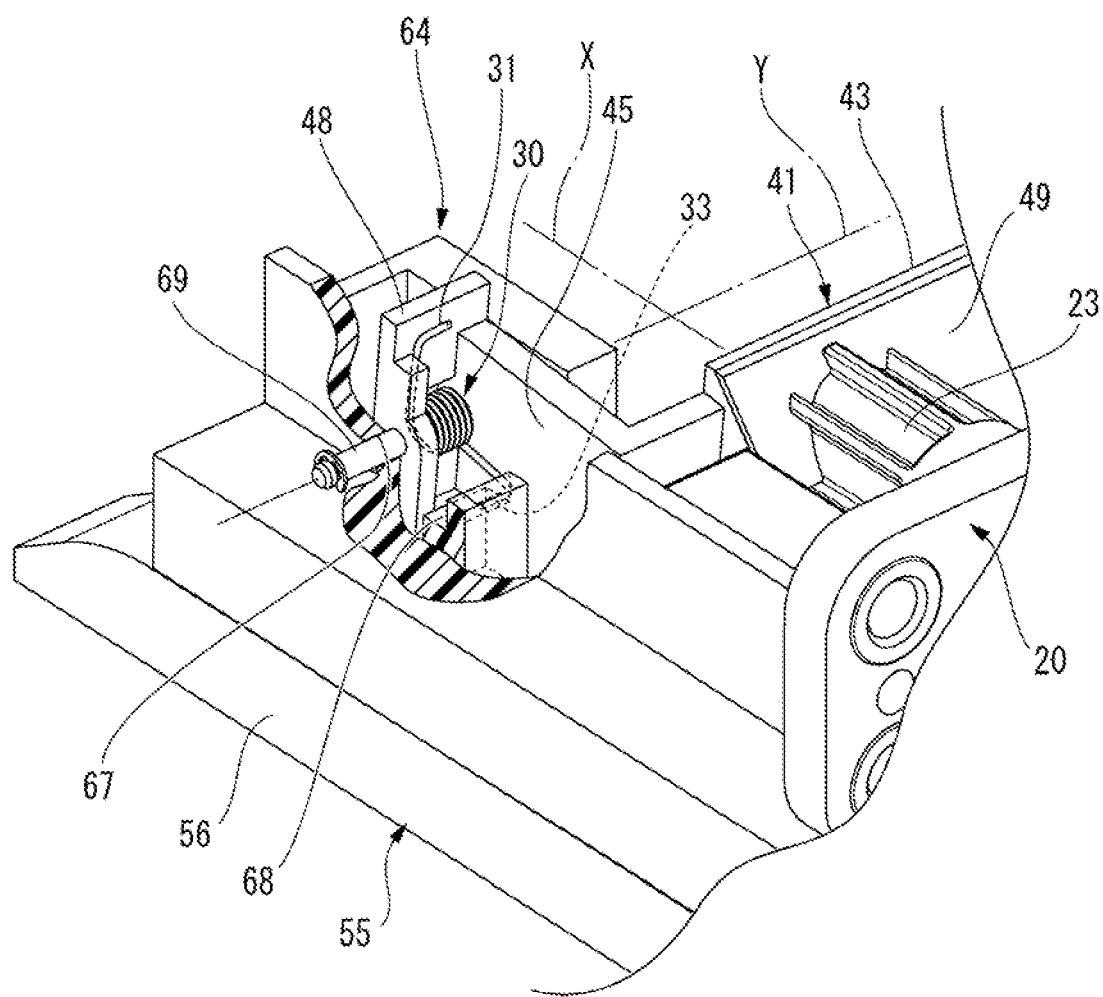
FIG. 4 is a partially cutaway enlarged perspective view for showing a cover support portion that rotatably supports the cover.

FIG. 4 is a partially cutaway enlarged perspective view for showing the cover support portion 64 that rotatably supports the cover 41.

As shown in FIGS. 3 and 4, support holes 65, 67 formed in facing side walls of the cover support portion 64 rotatably pivotally support the cover 41 via rotation support pins 69 inserted into through holes 47 of the cover 41. The cover support portion 64 is provided with a spring hooking portion 68 for hooking one end portion 33 of the torsion coil spring 30. The cover support portion 62 having a structure bilaterally symmetrical to the cover support portion 64 has the same configuration as the cover support portion 64.

In the top plate 50, an eaves portion 15 extends in front of an upper wall portion 13 that defines a housing space together with the bottom frame 55 and the main body frame 60.

A pair of fixing pieces 17, 17 for screwing and fixing the front wall 26 of the housing 20 by the screws 10 is vertically provided on a lower surface of the upper wall portion 13. In addition, on a lower surface at a central portion of the eaves portion 15, a pick-up rib 19 for guiding and fitting the plug housing 80 of the inlet plug 5 to the housing 20 housed in the outer case 51 extends along the connector fitting direction.

The cover 41 includes the cover portion 43, cover side walls 45, 45 vertically provided at both end portions of the cover portion 43, and an elastic packing 49 provided on a rear surface of the cover portion 43.

The elastic packing 49 is formed of an elastic member such as a sponge or rubber having a rectangular sheet shape, and is attached to the rear surface of the cover portion 43.

The flat plate-shaped cover portion 43 covers the front surface openings 25 of the pair of terminal housing cylinder portions 23, 23 protruding from the front wall 26 of the housing 20 housed in the outer case 51, respectively, such that the connection terminal 70 can be prevented from being exposed at the front surface openings 25 when the inlet 1 is not connected. The rear surface of the cover portion 43 in a cover closed position is a facing surface parallel to the inclined plane F in the opening edges 25*a* of the front surface openings 25, and the elastic packing 49 can elastically come into contact with the opening edges 25*a* of the front surface openings 25 in the pair of terminal housing cylinder portions 23, 23.

Front end portions of the cover side wall 45 are provided with the through holes 47, 47 formed in facing side walls, and pressed portions 48 extending above the cover side walls 45 from the through holes 47. The torsion coil springs 30 are disposed between the facing side walls in which the through holes 47, 47 are formed so as to be penetrated by the rotation support pin 69.

The through holes 47, 47 are positioned on extended end sides (opposite sides to the cover portion 43) of the cover side walls 45, 45 vertically provided at both end portions of the cover portion 43. Therefore, the cover 41 is rotatably pivotally supported by the cover support portions 62, 64 via the rotation support pins 69 inserted into the through holes 47, 47. That is, the cover 41 is rotatably supported about the rotation axis Y of the rotation support pin 69 intersecting with the opening center line X of the front surface opening 25 in front of the housing 20 with respect to the front surface opening 25. The rotation axis Y of the rotation support pin 69 does not need to completely intersect with the opening center line X of the front surface opening 25, and can be offset in the upper-lower direction in a range W in which the rotation axis Y is positioned on a front projection plane H of the front surface opening 25 in front of the housing 20 with respect to the front surface opening 25.

The pressed portion 48 is formed by connecting the facing side walls in which the through holes 47, 47 are formed, and has, on a front surface thereof, a facing surface with which a front end of a protruding portion 87, which will be described later, abuts (abuts and comes into contact). As shown in FIG. 4, the other end portion 31 of the torsion coil spring 30, whose the one end portion 33 is hooked on the spring hooking portion 68 of the cover support portion 64, is hooked on a rear surface of the pressed portion 48. Therefore, the cover 41 is elastically biased in a direction to close the front surface opening 25 by a repulsive force of the torsion coil spring 30.

The inlet plug 5 as the first connector according to the present embodiment includes the connection terminal 90 to be fitted to the connection terminal 70 of the inlet 1, the plug housing 80 as a first housing having a pair of terminal housing chambers 83, 83 housing the connection terminal 90, and a bracket 86 having a pair of protruding portions 87, 87 protruding toward the inlet 1 side along the connector fitting direction (see FIGS. 1, 6A and 6B).

The plug housing 80 is formed of an electrically insulating synthetic resin. The bracket 86 having the protruding portions 87, 87 capable of being pressed and biased to face the pressed portion 48 of the cover 41 is attached to the plug housing 80.

A fitting guide groove 85 is formed in an upper surface of the plug housing 80. The fitting guide groove 85 has a tapered portion whose width increases toward the inlet 1. When the inlet plug 5 is fitted to the inlet 1, the fitting guide groove 85 can guide and fit the plug housing 80 to the housing 20 by engaging with the pick-up rib 19 provided on the top plate 50 of the inlet 1.

The connection terminal 90, which is connected to a terminal portion of a high-voltage cable 91, is housed in each terminal housing chamber 83. The high-voltage cable 91 connected to the connection terminal 90 is drawn out from a rear end opening of each terminal housing chamber 83.

The connection terminal 90 is a male terminal formed of a conductive metal material, and is formed in a cylindrical rod shape. A joint hole 92 is formed in a rear end portion of the connection terminal 90. A conductor 93 of the high-voltage cable 91 drawn out from the rear end opening of the terminal housing chamber 83 is inserted into the joint hole 92, and is crimped and connected to the joint hole 92.

A seal member 95 is attached to the high-voltage cable 91 drawn out from the rear end opening of the terminal housing chamber 83, and thus the high-voltage cable 91 is liquid-tightly sealed relative to the terminal housing chamber 83. Detachment of the seal member 95 is restricted by a rear holder 97 attached to a rear end of the terminal housing chamber 83.

Next, a fitting operation of the inlet 1 and the inlet plug 5 will be described with reference to FIGS. 5 to 11B.

Figure 5:
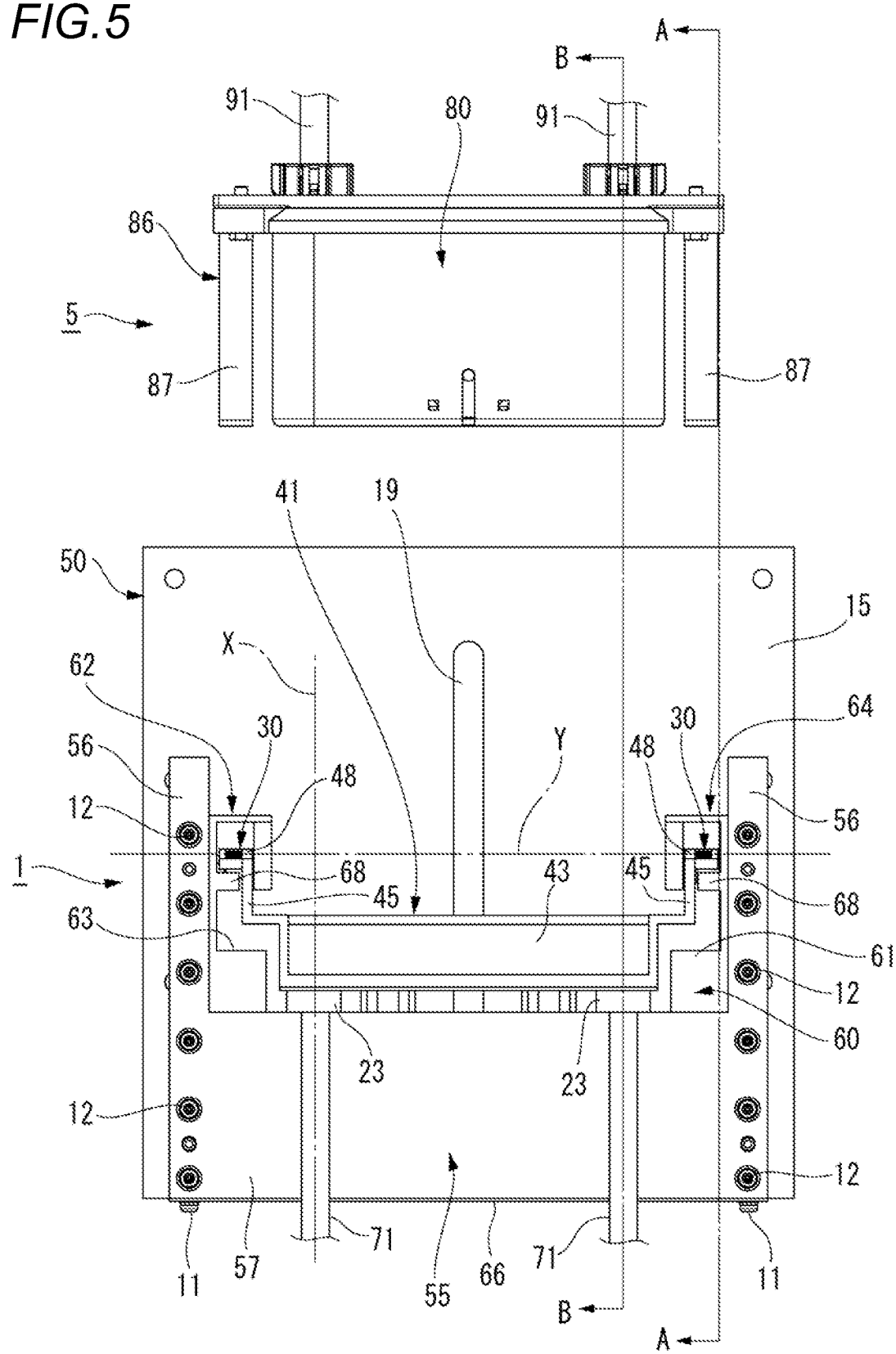
FIG. 5 is a bottom view showing a state before the inlet and the inlet plug shown in FIG. 1 are fitted to each other.

As shown in FIGS. 5, 6A and 6B, in a state where the inlet 1 and the inlet plug 5 are not fitted to each other, the cover 41 is in a cover closed position where the cover portion 43 covers the front surface opening 25 of the housing 20 by an elastic biasing force of the torsion coil spring 30.

Therefore, the connection terminal 70 of the inlet 1 is not exposed due to the closing of the cover 41. Accordingly, the inlet 1 is subjected to dust prevention and terminal protection, and is prevented from electric shock.

From such a state, insertion and fitting of the inlet plug 5 into the inlet 1 is started. First, from the state in FIGS. 6A and 6B, the inlet plug 5 is moved to the inlet 1 side, and the insertion and fitting of the plug housing 80 into the outer case 51 is started.

At this time, as shown in FIG. 7A, a front end portion of the protruding portion 87 on the bracket 86 of the inlet plug 5 abuts on the pressed portion 48 of the cover 41, and presses the pressed portion 48 against the elastic biasing force of the torsion coil spring 30.

Figure 8:
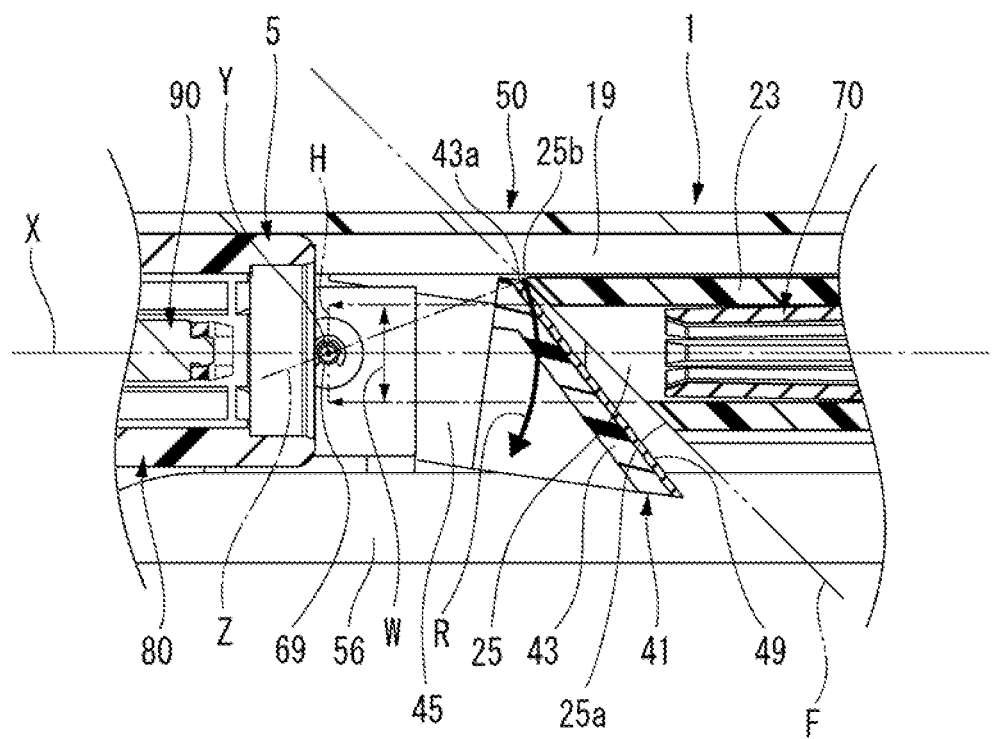
FIG. 8 is an enlarged view of a main part in FIG. 7B.

Then, as shown in FIGS. 7B and 8, the cover portion 43 of the cover 41 is rotated downward with the rotation support pin 69 as a rotation center.

Here, the opening edge 25*a* of the front surface opening 25 of the present embodiment has an inclined plane F that intersects with the connector fitting direction (the direction parallel to the opening center line X of the front surface opening 25) and is parallel to the rotation axis Y, and that intersects with the straight line Z, which extends from the opening edge end portion 25b (an upper side end portion of the opening edge 25a) of the front surface opening 25 on the rear side of the direction R in which the cover portion 43 rotates from the position (the position in FIG. 6B) where the cover portion 43 covers the front surface opening 25 toward the position (the position in FIG. 9B) where the cover portion 43 does not cover the front surface opening 25 and which orthogonal to the rotation axis Y, at an obtuse angle. That is, a rotation trajectory of an upper edge portion 43a of the cover portion 43 does not intersect with the opening edge 25a of the front surface opening 25. Therefore, when the cover 41 is opened and closed, for the cover portion 43, rubbing between the opening edge 25a of the front surface opening 25 and the cover portion 43 is reduced.

In addition, the cover 41 is rotatably supported about the rotation axis Y positioned on the front projection plane H of the front surface opening 25 in front of the housing 20 with respect to the front surface opening 25. That is, a protruding length, of the protruding portion 87 of the inlet plug 5 that presses the pressed portion 48 of the cover 41, protruding toward the inlet 1 side can be shortened by an amount by which the rotation axis Y of the cover 41 is displaced toward the front of the housing 20 (toward the inlet plug 5 side) with respect to the front surface opening 25. Therefore, the inlet plug 5 can be made compact by reducing the protruding length of the protruding portion 87.

Figure 9A:
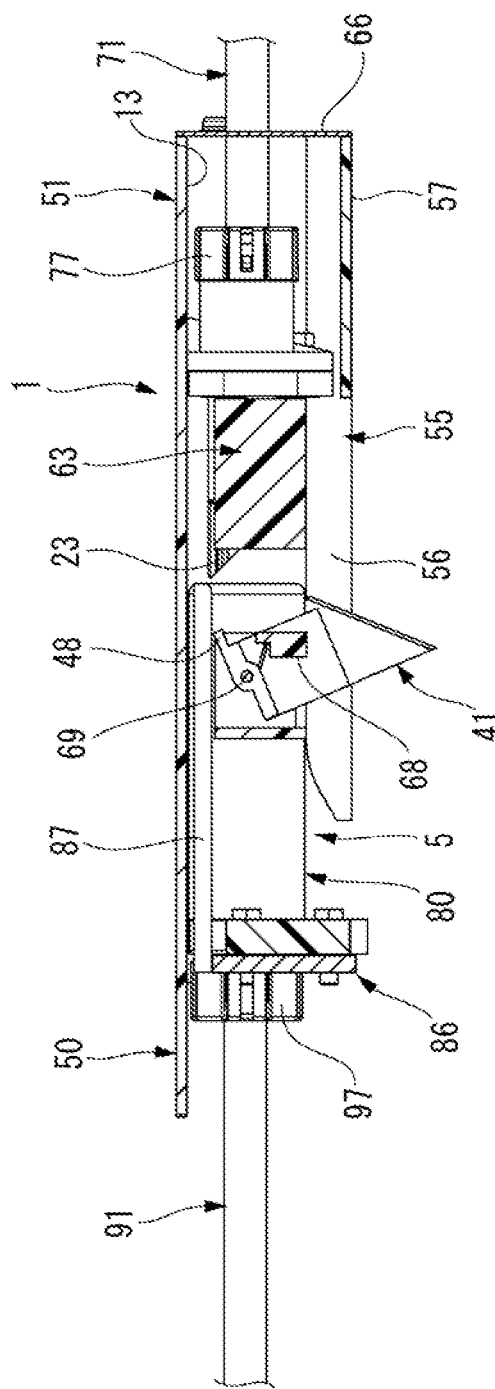
FIGS. 9A and 9B are a longitudinal cross-sectional view showing a state in which the inlet and the inlet plug shown in FIG. 5 are being fitted to each other, in which FIG. 9A corresponds to a cross section taken along line A-A in FIG. 5, and FIG. 9B corresponds to a cross section taken along line B-B in FIG. 5.
Figure 9B:
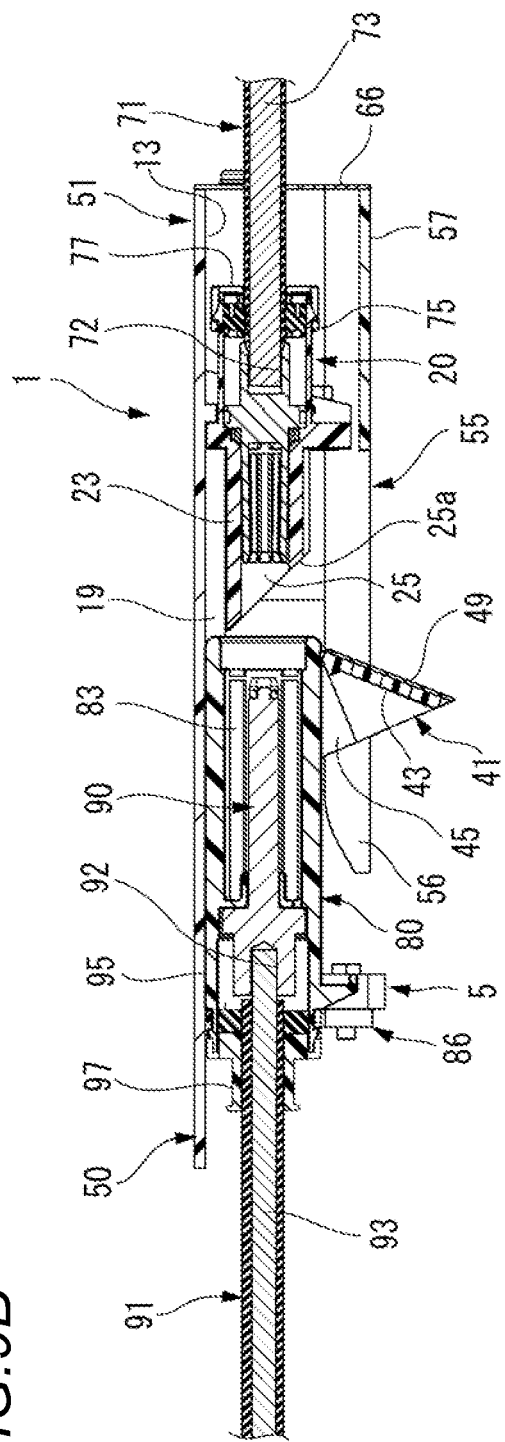
Figure 10:
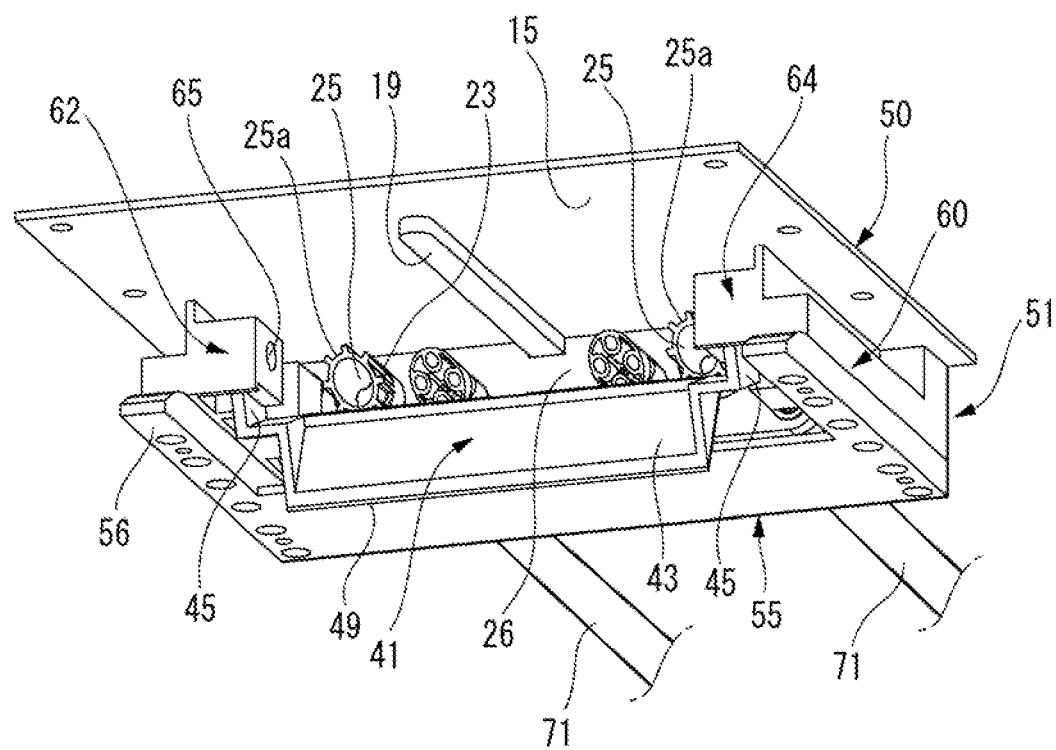
FIG. 10 is a perspective view, in which the inlet plug is omitted, of the inlet during fitting.

When the inlet plug 5 is further deeply inserted into the inlet 1 so as to advance to the rear side of the inlet 1 from the state shown in FIGS. 7A and 7B, as shown in FIGS. 9A, 9B and 10, the cover 41 is rotated to a cover open position where the cover portion 43 does not cover the front surface opening 25.

Then, when the inlet plug 5 is further deeply inserted into the inlet 1 so as to advance to the rear side of the inlet 1, as shown in FIGS. 11A and 11B, the connection terminal 90 of the inlet plug 5 is fitted and connected to the connection terminal 70 of the inlet 1, and accordingly, the high-voltage cable 71 and the high-voltage cable 91 are electrically connected to each other.

Therefore, the housing 20 of the inlet 1 and the plug housing 80 of the inlet plug 5 are fitted and electrically connected to each other by bringing the front end portion of the protruding portion 87 on the bracket 86 and the pressed portion 48 of the cover 41 into contact with each other.

As described above, according to the inlet 1 of the present embodiment, the elastic packing 49 provided on the cover portion 43 can be brought into elastic contact with the opening edge 25a of the front surface opening 25. Therefore, the elastic packing 49 that contacts the opening edge 25a and covers the front surface opening 25 can more reliably prevent dust, water, and the like from entering the front surface opening 25 of the housing 20.

In addition, according to the inlet 1 of the present embodiment, the cover 41 rotatably provided on the outer case 51 is rotatable around the rotation axis Y intersecting with the opening center line X of the front surface opening 25 in front of the housing 20. That is, the cover 41 is rotated about the rotation axis Y of the cover 41 intersecting with the opening center line X of the front surface opening 25, such that a rotation radius can be made compact while reducing a rotation force of the protruding portion 87 of the inlet plug 5.

According to the inlet 1 and the inlet plug 5 forming the connector of the present embodiment described above, it is possible to provide a compact connector which prevents wear of the housing 20 and the cover 41 in the inlet 1 and in which the inlet plug 5 is made compact.

The present disclosure is not limited to the embodiment described above, and modifications, improvements, and the like can be made as appropriate. In addition, materials, shapes, dimensions, numbers, arrangement positions, and the like of each constituent element in the embodiment described above are optional and not limited as long as the object of the present disclosure can be achieved.

For example, in the above embodiment, although an inlet used for an electric vehicle and the like as a cover-mechanism-equipped connector has been described as an example, the connector of the present disclosure is not limited thereto, and can be applied to various connectors based on a gist of the present disclosure.

In addition, in the above embodiment, the cover 41 is rotated downward with the rotation axis Y extending in the left-right direction of the inlet 1 as a rotation center, but the cover 41 may be rotated upward. In addition, the cover may be configured to rotate laterally with the rotation axis extending in the upper-lower direction of the inlet as the rotation center. That is, a rotation direction of the cover with respect to the inlet is appropriately set according to the attachment direction of the inlet when the vehicle body is attached.

According to a first aspect of the present disclosure, a connector includes: a first connector (inlet plug 5); and a second connector (inlet 1), in which the first connector (5) and the second connector (1) are fitted and electrically connected to each other. The first connector (5) includes a first housing (plug housing 80) that houses a first connection terminal (connection terminal 90), and a protruding portion (87) that protrudes from the first housing (80) toward the second connector (1) along a connector fitting direction. The second connector (1) includes a second housing (housing 20) that houses a second connection terminal (connection terminal 70), a cover (41) that has a cover portion (43) configured to cover a front surface opening (25) of the second housing (20) and that is provided rotatably between a first position where the cover portion (43) covers the front surface opening (25) and a second position where the cover portion (43) does not cover the front surface opening (25), and a biasing member (torsion coil spring 30) that biases the cover (41) to the first position. The cover (41) is rotatably supported about a rotation axis (Y) positioned on a front projection plane (H) to which the front surface opening (25) is projected in front of the second housing (20) than the front surface opening (25). The front surface opening (25) includes an opening edge (25a) with which the cover portion (43) contacts to cover the front surface opening (25), and an opening edge end portion (25b) positioned on a rear side in a direction (R) in which the cover portion (43) rotates from the first position toward the second position. The opening edge (25a) includes an inclined plane (F) that intersects with the connector fitting direction (direction parallel to an opening center line X of the front surface opening 25) and that is parallel to the rotation axis (Y), the inclined plane (F) intersecting at an obtuse angle with a straight line (Z) that extends from the opening edge end portion (25b) and that orthogonal to the rotation axis (Y). The connector is designed to rotate the cover (41) to the second position in response to the protruding portion (87) pressing a pressed portion (48) of the cover (41).

According to the connector having the configuration of the first aspect, the front surface opening of the second housing in the second connector is covered by the cover in which the cover portion is in contact with the opening edge.

Therefore, it is possible to reliably prevent dust, water, and the like from entering the front surface opening of the second housing.

Then, when the first connector and the second connector are fitted to each other, the protruding portion of the first connector presses the pressed portion of the cover in the second connector, such that the cover can be rotated from the position (cover closed position) where the cover portion covers the front surface opening of the second housing to the position (cover open position) where the cover portion does not cover the front surface opening. Here, the opening edge of the front surface opening has the inclined plane that intersects with the connector fitting direction and is parallel to the rotation axis of the cover, and that intersects with the straight line, which extends from the opening edge end portion of the front surface opening on the rear side of the direction in which the cover portion rotates from the position where the cover portion covers the front surface opening toward the position where the cover portion does not cover the front surface opening and which orthogonal to the rotation axis, at the obtuse angle. That is, a rotation trajectory of the cover portion does not intersect with the opening edge of the front surface opening. Therefore, when the cover is opened and closed, for the cover portion, rubbing between the opening edge of the front surface opening and the cover portion is reduced.

In addition, the cover is positioned on the front projection plane of the front surface opening in front of the second housing with respect to the front surface opening. That is, a protruding length, of the protruding portion of the first connector that presses the pressed portion of the cover, protruding toward the second connector side can be shortened by an amount by which the rotation axis of the cover is displaced toward the front of the second housing (toward the first connector side) with respect to the front surface opening. Therefore, the first connector can be made compact by reducing the protruding length of the protruding portion.

According to a second aspect of the present disclosure, the cover portion (43) may include an elastic packing (49) that elastically contacts with the opening edge (25a) of the front surface opening (25).

According to the connector having the configuration of the second aspect, the elastic packing provided on the cover portion can elastically contact with the opening edge of the front surface opening. Therefore, the elastic packing that comes into contact with the opening edge and covers the front surface opening can more reliably prevent dust, water, and the like from entering the front surface opening of the second housing.

According to a third aspect of the present disclosure, the cover (41) may be rotatably supported about the rotation axis (Y) intersecting with an opening center line (X) of the front surface opening (25).

According to the connector having the configuration of the third aspect, the cover rotatably provided is rotatable around the rotation axis intersecting with the opening center line of the front surface opening in front of the second housing. That is, the cover is rotated about the rotation axis of the cover intersecting with the opening center line of the front surface opening, such that a rotation radius can be made compact while reducing a rotation force of the protruding portion of the first connector.

According to the present disclosure, it is possible to provide a connector which is compact and can prevent wear of a housing and a cover in a cover-mechanism-equipped connector.

What is claimed is:
1. A connector comprising:
a first connector; and
a second connector, wherein
the first connector and the second connector are fitted and electrically connected to each other,
the first connector includes a first housing that houses a first connection terminal, and a protruding portion that protrudes from the first housing toward the second connector along a connector fitting direction,
the second connector includes a second housing that houses a second connection terminal, a cover that has a cover portion configured to cover a front surface opening of the second housing and that is provided rotatably between a first position where the cover portion covers the front surface opening and a second position where the cover portion does not cover the front surface opening, and a biasing member that biases the cover to the first position,
the cover is rotatably supported about a rotation axis positioned on a front projection plane to which the front surface opening is projected in front of the second housing than the front surface opening,
the front surface opening includes an opening edge with which the cover portion contacts to cover the front surface opening, and an opening edge end portion positioned on a rear side in a direction in which the cover portion rotates from the first position toward the second position,
the opening edge includes an inclined plane that intersects with the connector fitting direction and that is parallel to the rotation axis, the inclined plane intersecting at an obtuse angle with a straight line that extends from the opening edge end portion and that orthogonal to the rotation axis, and
the connector is designed to rotate the cover to the second position in response to the protruding portion pressing a pressed portion of the cover.

2. The connector according to claim 1, wherein the cover portion includes an elastic packing that elastically contacts with the opening edge of the front surface opening.

3. The connector according to claim 1, wherein the cover is rotatably supported about the rotation axis intersecting with an opening center line of the front surface opening.

* * * * *